United States Patent [19]

Luerken

[11] 4,296,852

[45] Oct. 27, 1981

[54] AUTOMATIC TWO-WAY CENTRIFUGAL CLUTCH FOR MOTOR DRIVEN APPARATUS

[75] Inventor: Adolf Luerken, Palos Verdes, Calif.

[73] Assignee: McCulloch Corporation, Los Angeles, Calif.

[21] Appl. No.: 883,655

[22] Filed: Mar. 6, 1978

Related U.S. Application Data

[63] Continuation of Ser. No. 850,136, Nov. 10, 1977, abandoned.

[51] Int. Cl.³ .................. F16D 23/10; F16D 43/24
[52] U.S. Cl. ..................... 192/104 B; 192/105 CD
[58] Field of Search ............. 192/105 CD, 105 CE, 192/103 B, 104 B

[56] References Cited

U.S. PATENT DOCUMENTS

| | | | |
|---|---|---|---|
| 2,275,046 | 3/1942 | Harris | 192/105 CD |
| 3,024,886 | 3/1962 | Peras | 192/105 CE |
| 3,173,528 | 3/1965 | Mennesson | 192/103 B |

FOREIGN PATENT DOCUMENTS

| | | | |
|---|---|---|---|
| 1109553 | 9/1955 | France | 192/105 CD |
| 1169492 | 9/1958 | France | 192/103 B |
| 894071 | 4/1962 | United Kingdom | 192/103 B |

Primary Examiner—C. J. Husar
Assistant Examiner—Moshe I. Cohen
Attorney, Agent, or Firm—Kenway & Jenney

[57] ABSTRACT

An automatic two-way centrifugal clutch having a pair of clutch members mounted for pivotal movement on a rotating drive member is disclosed. Each clutch member has a first state in which driven surfaces are in contact with a clutch drum interior friction drive surface; a second state in which the clutch members are out of contact with the drum frictional drive surface; and a third state in which clutch driving surfaces are in driving contact with the frictional drive surface. At least two spring members are connected between the clutch members, the springs urging, when the speed of rotation of the drive member is below a first selected speed, the clutch driven surfaces against the frictional drive surface. When the rotational speed of the rotating drive member is greater than the first selected speed, centrifugal force overcomes the spring force and urges the clutch members, which are mounted symmetrically with respect to the rotation axis, to pivot to a position wherein the clutch driven surfaces are out of engagement with the frictional drive surface. If the rotation speed is greater than a second selected speed, the centrifugal force urges the clutch driving surfaces into driving contact with the frictional drive surface. By an appropriate choice of springs and spring position, a significant and distinct idle range, which is substantially independent of the device manufacturing tolerance, is defined.

6 Claims, 12 Drawing Figures

AUTOMATIC TWO-WAY CENTRIFUGAL CLUTCH FOR MOTOR DRIVEN APPARATUS

CROSS REFERENCE TO RELATED APPLICATIONS

This application is a continuation of my application Ser. No. 850,136, filed Nov. 10, 1977 and now abandoned.

BACKGROUND OF THE INVENTION

This invention relates in general to centrifugal clutches, and in particular to an automatically acting two way centrifugal clutch for transferring torque between the output of a motor and a rotating member.

Clutches have long been used to selectively transfer rotary drive power from the motor of a vehicle to its driving wheels. In particular, lightweight and inexpensive engines have been used for many years for driving small motorized vehicles such as bicycles, wheelbarrows, and motorcarts; and these engine-powered vehicles have in the past been equipped with clutches which automatically (a) crank the engine when the vehicle is initially moved in a working direction, (b) provide an idle condition or state in which the engine is mechanically disconnected from the drive wheels whenever it operates at a speed in a predetermined idle speed range, and (c) transfer torque from the engine to the vehicle driving wheels when the engine speed is increased beyond a predetermined or preselected maximum idle speed (the run or drive condition).

In general, the early automatic clutches use a pair of rotating clutch assemblies, each assembly having a friction surface for engaging a clutch drum in both the starting and driving modes of operation. A few of the early automatic clutches have two friction surfaces, one for the starting mode and one for the driving mode of operation. Each of the surfaces is generally associated with a separate pivoted clutch element, a pair of elements comprising a clutch assembly. In these clutches, as described in British Pat. No. 894,071, published Apr. 18, 1962, one of the friction surfaces is driven by the clutch drum to start the engine and the second surface is driven by the drive motor once the motor attains sufficient rotational speed, to transfer torque to the vehicle wheels when the speed of the engine is increased beyond a selected speed.

As a further variation in the construction of automatic centrifugal clutches, the apparatus described in French Pat. No. 1,169,492, published on Dec. 29, 1958, reflects the need for a clutch at a time when maintaining a stable idle speed range over the life of the bicycle was not a major concern. This clutch uses integral clutch members, each having two friction surfaces and connected by springs configured to provide a differential spring system having an idle speed range very sensitive to manufacturing tolerances. However, at that time, about 1958, the idle condition or state was apparently not used very much and hence the limited idle range caused no significant problems.

The apparatus disclosed in the French patent does not lend itself, however, to today's modern engine speeds or today's traffic patterns which can require long idle periods, for example, at red traffic lights. Thus, today, the clutch/spring configuration of the French apparatus, wherein the springs are located close to the clutch drum and outside the clutch member pivot points, have relatively large spring constants, and have small spring elongation relative to clutch member movement, is unacceptably sensitive to manufacturing tolerances and other alignment errors. The French design would likely, after long idle periods, tend to wear and produce heat at the drum surface, and the engine speed would have to be raised to bring the clutch surface into a definite drive position with the clutch drum.

It is therefore a principal object of this invention to provide an automatic clutch apparatus designed to have a definite and well defined idle condition or zone. Other objects of the invention are to provide an automatic two way acting centrifugal clutch which is reliable, which has a long lifetime, which will not wear out during long idle periods, which is low in manufacturing cost, and which can be used with lightweight vehicles.

SUMMARY OF THE INVENTION

The invention features a centrifugal clutch having a rotating support member having a first rotation axis, first and second integral clutch members, a rotatable clutch drum, and at least a first and second spring members. Each clutch member is supported by the support member along a respective pivot axis for pivotal rotation movement about the pivot axis in a plane normal to the rotation axis, and each pivot axis is parallel to, separated from, and symmetrically placed with respect to the rotation axis. The rotatable clutch drum has an axis of rotation concentric with the first rotation axis and a circular, inwardly facing, frictional drive surface radially spaced from and parallel to the rotation axis. Each clutch member further has a driving surface and a driven surface. The two clutch surfaces each have a radius of curvature substantially equal to the radius of curvature of the frictional drive surface. The clutch members are pivotably supported so that the driven clutch surfaces each engage the frictional drive surface in a first pivotal position of the clutch members and the driving clutch surfaces each engage the frictional drive surface in a second pivotal position of the clutch members. First and second spring members are provided, each being connected between the first and second clutch members. Each spring member is under tension; and the springs, at each connection point with the clutch members, exert substantially no rotational force for urging a driving surface against the frictional drive surface. The clutch members further have a mass distribution and the springs a spring constant whereby below a first rotational speed of the support member, the driven clutch surface is in driven contact and engagement with the frictional drive surface; upon rotation of the support member beyond the first rotational speed, the driven clutch surface pivots out of engagement with the frictional drive surface; and upon rotation of the support member beyond a second rotational speed greater than the first rotational speed, the driving clutch surface is urged against and engages the frictional drive surface. Thereby, when the clutch members pivot from the first position wherein the driven clutch surfaces engage the frictional drive surface to the second position wherein the driving clutch surfaces engage the frictional drive surface, the spring members extend at a rate greater than the radial rate of travel of each clutch member center of gravity thereby defining a range of rotational speed in which the clutch surfaces do not engage the frictional drive surface.

In another aspect of the invention, the centrifugal clutch features at least third and fourth spring members connected between the first and second clutch members. The third and fourth spring members are in a relaxed condition in the first position of the clutch members and are in a tensioned condition when the clutch members are in the second position. Thereby, the extent of the range of rotational speed in which the clutch surfaces do not engage the frictional drive surface is extended.

In another aspect of the invention, the clutch features each of the first and second springs having a first end connected to the first and second clutch members respectively, substantially at the respective pivot axis of the clutch member. Thereby, the first ends maintain a substantially fixed position as the respective clutch member pivots about its pivot axis. In contrast, the second end of each spring member is connected to a respective clutch member for urging the driven surface of the clutch member against the frictional drive surface in a start-up state.

In yet another aspect of the invention, the clutch features each of the first and second spring elements, at each connection point of a spring with the clutch members, urging one of the driven surfaces against the frictional drive surface in a first start-up state.

DESCRIPTION OF THE DRAWINGS

Other objects, features and advantages of the invention will appear in the following description of preferred embodiments of the invention taken together with the drawings in which.

DESCRIPTION OF PARTICULAR PREFERRED EMBODIMENTS

Figure 1:
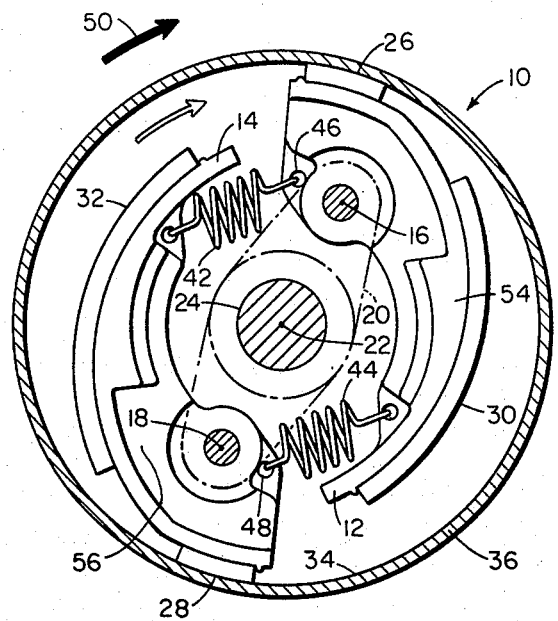
FIGS. 1, 2, and 3 are simplified cross-sectional views of a clutch according to the invention, in the start, idle, and run positions respectively.
Figure 2:
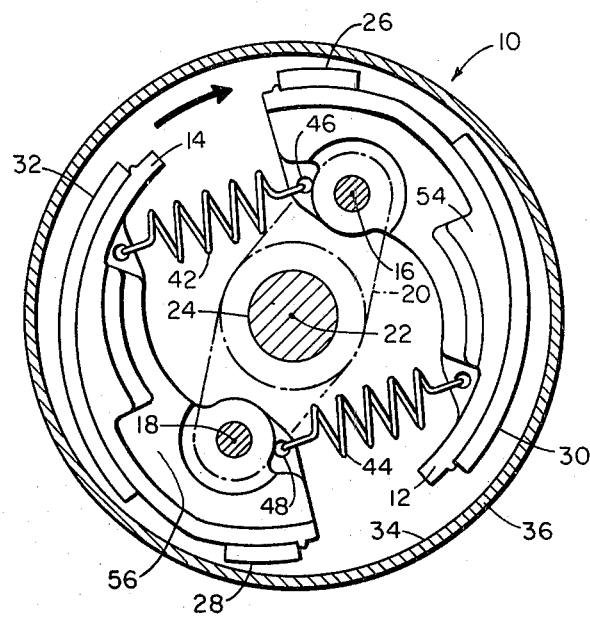
Figure 3:
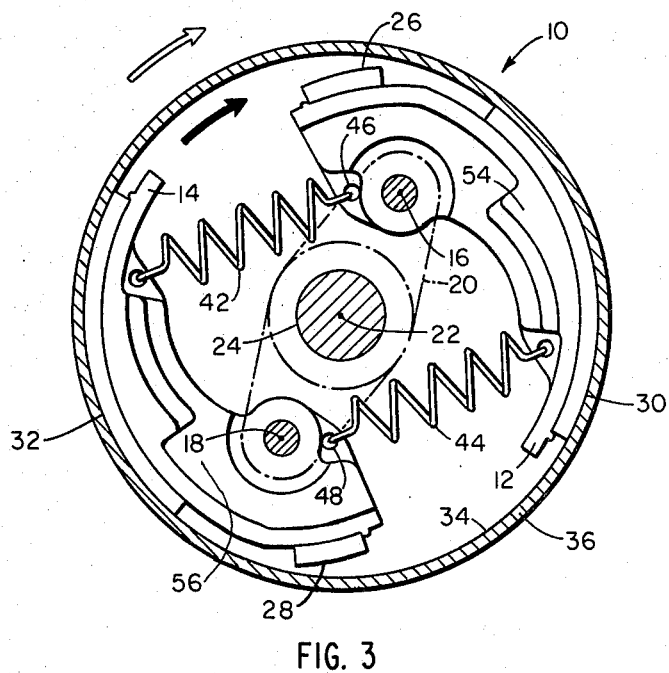

Referring to FIGS. 1-3, a clutch assembly 10 according to a preferred embodiment of the invention comprises two clutch members or shoes 12 and 14 each of which are pivotably mounted along the pivot axes 16, 18 to a rotating support member 20. Member 20 rotates around its rotation axis 22 and may be connected to a rotating shaft 24 (FIG. 12), for example, the crankshaft of an internal combustion engine.

Each clutch member 12, 14 comprises a driven clutch surface 26, 28 and a driving clutch surface 30, 32 respectively. Each of surfaces 26, 28, 30, 32 has the same radius of curvature which equals the radius of curvature of a circular, inwardly facing, frictional drive surface 34 of a clutch drum 36. Clutch drum 36 is typically journalled for rotation on the shaft 24 and is connected to, for example through a friction drive, the wheel of the motorized vehicle such as the wheel of a bicycle, wheelbarrow, motorcart, etc.

Springs 42 and 44 connect between the clutch members 12, 14, at two locations symmetrically placed with respect to the axis of rotation 22. Typically, the springs are connected between the clutch members at positions whereby the springs exert substantially no rotational force for urging a driving clutch surface 30 or 32 to pivot about the pivot axes 16, 18 respectively and to engage the clutch drum internal drive surface 34. The illustrated springs 42, 44 are however typically connected between clutch members 12, 14 so that the springs are in tension and urge the clutch members to pivot to a first position wherein driven surfaces 26, 28 are in contact with and engage frictional drive surface 34. The illustrated spring members in FIG. 1 are connected at one end in apertures 46, 48 provided in clutch members 12, 14 near the pivot axes 16, 18. Thus, the ends of springs 42, 44 in apertures 46, 48 are maintained in a substantially fixed position while the clutch members pivot around axes 16, 18.

The clutch operates as follows. Initially, both the clutch drum and the shaft 24 and support member 20 are at rest. In this start-up state or condition, FIG. 1, the driven surfaces 26, 28 are urged by springs 42, 44 to engage friction surface 34 of drum 36. Thereafter, the clutch drum is rotated, for example through the rotational torque imparted by rolling the vehicle in the forward direction. The clutch drum 36 is thereby turned in the direction of arrow 50 and correspondingly, the support member 20 is rotated by the rotation imparted by surface 34 on clutch members 12, 14 through surfaces 26, 28 respectively. As a result, a drive motor can be cranked and started.

As the motor comes up to an idle speed, support member 20 is turned (in a clockwise direction in FIGS. 1-3) and the clutch members and clutch drum are rotated at the same rotational speed and also in the clockwise direction. However, as the clutch members rotate about rotation axis 22, centrifugal force acts upon each clutch member, effectively at the center of gravity 54, 56 of the clutch member, and in a direction opposite to the net spring force acting upon the clutch member. Thus, as the rotational speed increases, so does the effective centrifugal force until the clutch members begin to pivot. Thus, at a selected rotational speed, the surfaces 30 and 32 begin to move closer to the friction drive surface 34 and surfaces 26, 28 disengage from the surface 34 of the clutch drum (FIG. 2). This is the idle condition wherein the motor is disengaged from the clutch drum.

As the rotational speed of the engine increases, the clutch members continue to pivot to bring surfaces 30, 32 closer to the surface 34 of the clutch drum 36. At a second selected speed, higher than the first selected speed, the surfaces 30 and 32 engage, substantially at the same time, the surface 34 of the clutch drum to drive it in the clockwise direction thereby applying torque to, for example, the drive wheels of a vehicle. In this condition, the run condition (FIG. 3), the centrifugal force has overcome the now increased spring force and has forced the surfaces 30 and 32 into engagement with the surface 34 of the clutch drum.

By appropriate choice of spring constant and spring length, as shown in FIGS. 1-3, there is designed a system with a clearly defined range of idle speed. This clearly defined range is attained using a spring placement wherein the springs elongate at a rate faster than the radial movement of the center of gravity of the clutch members as described below in connection with FIG. 11.

Figure 4:
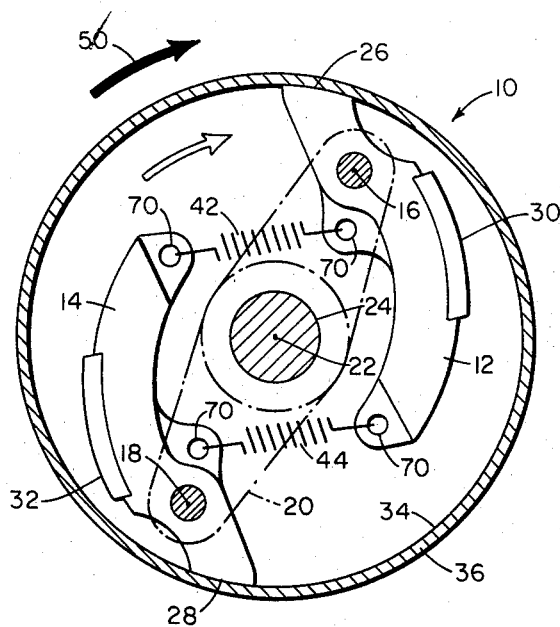
FIGS. 4, 5, and 6 are simplified cross-sectional views of a second embodiment according to the invention, in the start, idle, and run positions, respectively.
Figure 5:
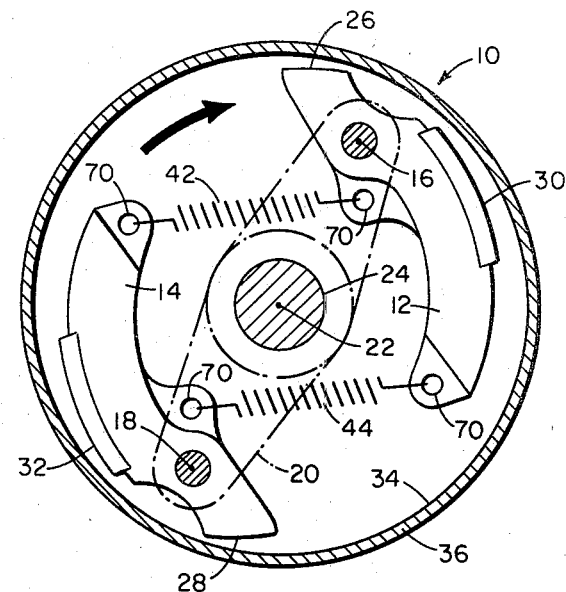
Figure 6:
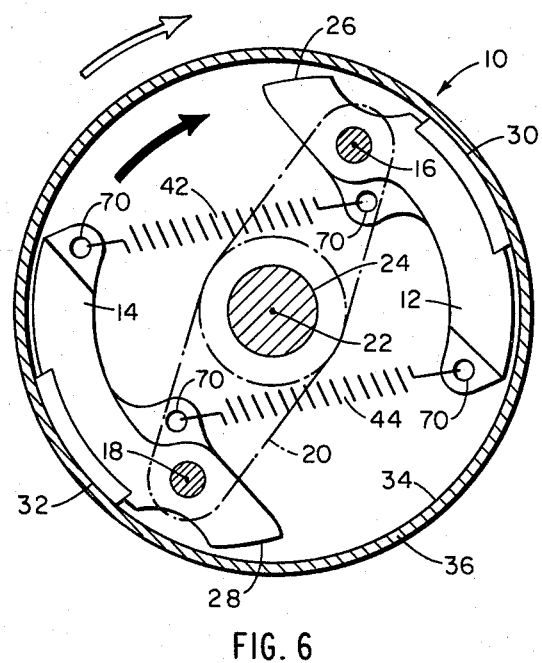

Referring now to FIGS. 4–6, the position at which the spring members 42, 44 connect to the clutch members 12, 14 can be varied over a substantial range so long, as noted above, as the springs do not at any connection point exert any substantial rotational force tending to rotate the clutch member to a position wherein surfaces 30, 32 would contact drive surface 34. In particular, springs 42, 44 may be connected so that all of the spring forces acting upon the clutch members are directed to urge driven surfaces 26, 28 into contact with frictional drive surface 34. Thus, in the particular embodiment of FIGS. 4–6, the spring connection points, represented by apertures 70 in clutch members 12, 14 are positioned, when surfaces 26, 28 and 34 are in contact, in the region generally located between the pivot axes 16, 18. This enables a greater rate of increase of spring length with respect to radial movement of the clutch members center of gravity.

Figure 7:
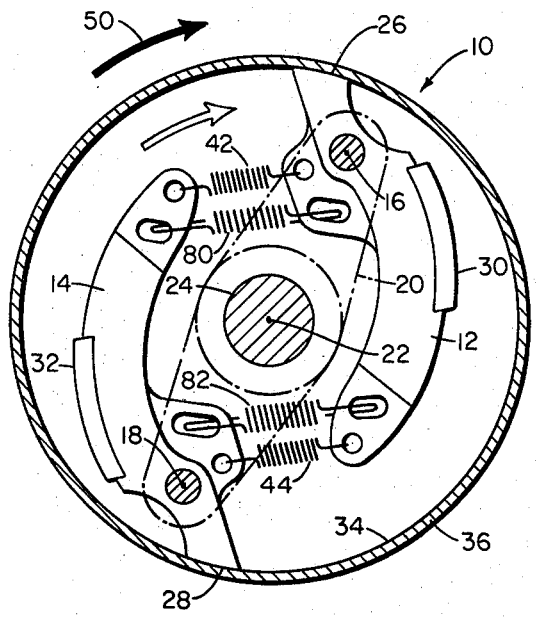
FIGS. 7, 8, and 9 are simplified cross-sectional views of a third embodiment according to the invention, in the start, idle and run positions respectively.
Figure 8:
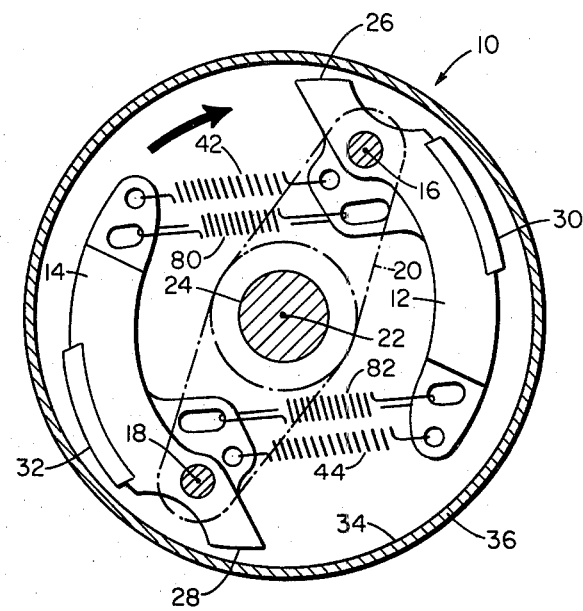
Figure 9:
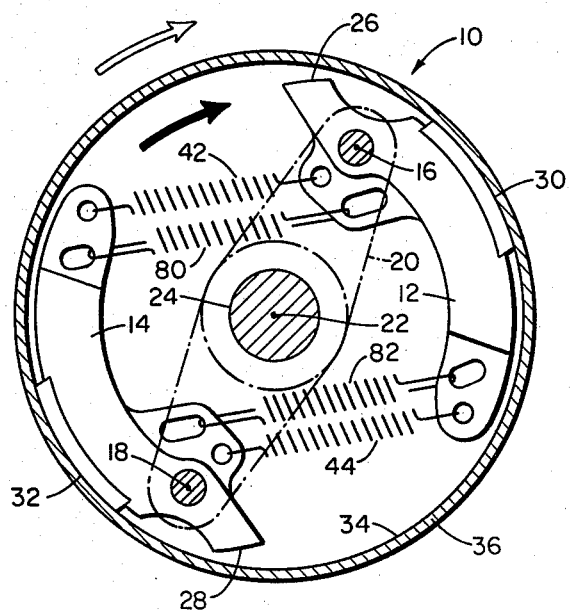

Referring now to FIGS. 7–9, the clearly defined idle range according to the invention can be extended or exaggerated by using a second pair of spring members 80, 82 connected between the clutch members so that the third and fourth springs are in a relaxed condition and thus have no effect upon the clutch in the start position (FIG. 7). However, towards preferably about the middle of the idle range, the second spring begins contributing additional spring restoring force (FIG. 8) which necessitates a higher rotation drive speed for support member 20 to bring driven surfaces 30, 32 into engagement with the interior drive surface 34 of the clutch drum (FIG. 9).

Figure 10:
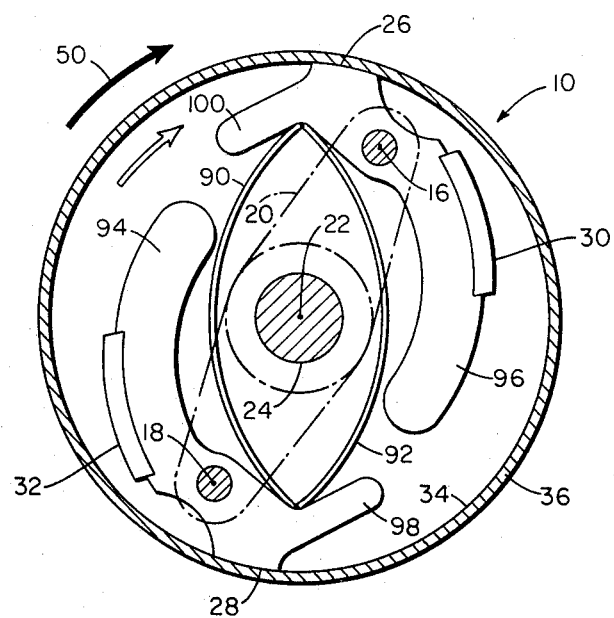
FIG. 10 is a simplified cross-sectional view of another embodiment according to the invention showing the start position.

Referring to FIG. 10, the coil springs 42, 44, 80, 82 of FIGS. 1–9 can be replaced by a pair of leaf springs 90, 92 and appropriately configured clutch members 94, 96. A suitable configuration is shown in the start position in FIG. 10. The leaf spring configuration additionally provides, (if the shape of the clutch shoe is properly chosen), an extended idle zone as extended arms 98, 100 mechanically engage springs 90, 92 to effectively increase the spring constant of the system.

Figure 11:
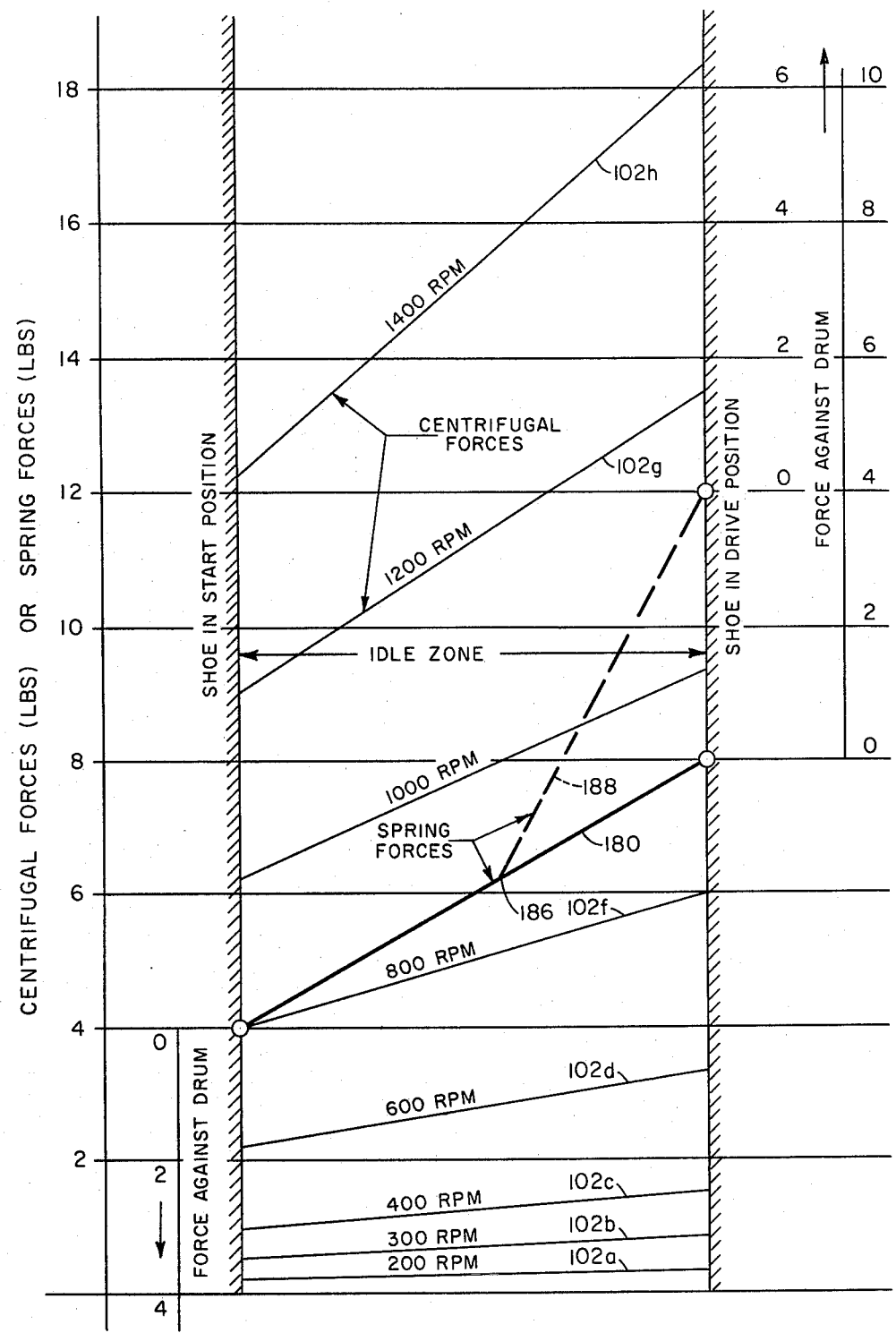
FIG. 11 is a diagram showing the relative forces acting upon each clutch member according to the particular preferred embodiments of the invention.

Referring now to FIG. 11, the forces acting upon the center of gravity of each clutch member, to provide a clearly defined idle region according to the invention, are depicted. The travel of the clutch member around its respective pivot axis is represented by a linear shift between the clutch member's extreme positions, that is, between a first position wherein the clutch member surface 26 or 28 is in contact with the interior surface 34 of the clutch drum (designated "shoe in start position" in FIG. 11) and a second position wherein the clutch member surface 30 or 32 is in contact with the interior surface 34 of the clutch drum (designated "shoe in drive position" in FIG. 11). Accordingly, the invention has clutch members which are subject to varying forces, depending upon the pivotal position of the member. Lines 102a, 102b, . . . , 102h, plot the centrifugal force, at different rpm, acting upon a typical clutch member as a function of clutch member position (the horizontal coordinate direction). Thus, for example, at 400 rpm, in the start position, the centrifugal force is approximately 1 pound in a radially outward direction.

Correspondingly, the heavy line 180 plots the spring force, in a radially inward direction, as a function of clutch member position. Thus, in a typical example, the spring force in the start position is chosen to be approximately 4 pounds, and increases to 8 pounds in the run or drive position. Thus, the clutch assembly must rotate at 800 rpm before the centrifugal force equals the spring force in the start position. This first rotation speed, is the low end of the idle speed range.

As the rotational speed of the engine increases beyond 800 rpm, to approximately 920 rpm, in the illustrated example, there is a continued balancing or equalizing of the spring and centrifugal forces acting on the clutch members. For each speed between 800 and about 920 rpm, the idle speed range, each clutch member will maintain an idle position between its extreme pivot positions wherein the clutch driving and driven surfaces will not contact the interior surface 34 of the clutch drum. The slope of line 180 is fixed primarily by the choice of spring constants and the elongation of the springs relative to the clutch member's pivotal movement.

When a second pair of springs is added as described in connection with FIGS. 7–9, there is achieved a break point 186 at which the second spring begins to contribute to the spring restoring forces acting on the clutch members. The effect, as shown, is to increase the effective spring constant of the assembly which is represented by an increased slope (dashed line 188) in FIG. 11. Thus, whereas the original idle zone extended approximately 120 rpm, the idle zone for the four spring system extends approximately 320 rpm.

As noted above, the slope of line 180, representing the spring force versus clutch member position, is proportional to both the spring constant and the relative elongation of the spring as the clutch member pivot. In each of the illustrated embodiments of FIGS. 1–9, the spring connections to the clutch members are structured to provide a large spring distension as the clutch members pivot, since this minimizes operating difficulties due to component part tolerances.

Figure 12:
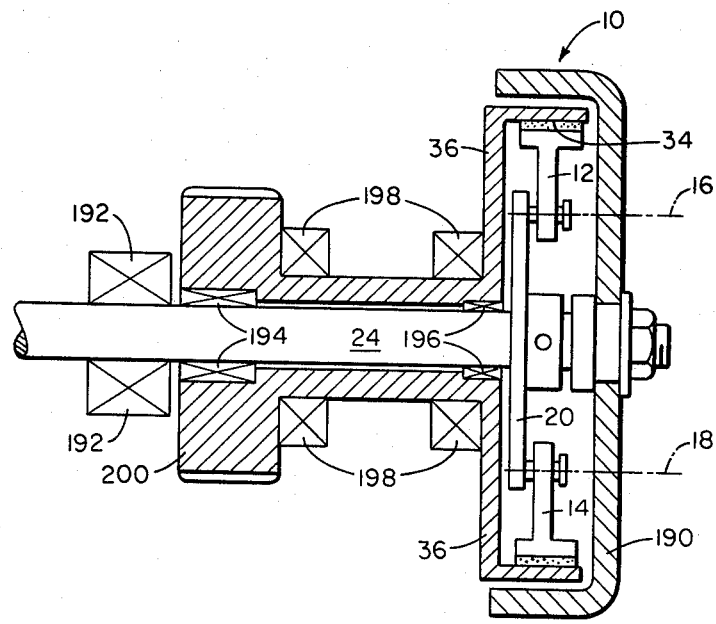
FIG. 12 is a cross-sectional view, which has been simplified to show a typical mounting of a clutch constructed according to the invention.

Referring to FIG. 12, the clutch assembly, including support member 20, clutch members 12, 14 and clutch drum 36, is typically supported on rotating shaft 24 which is connected to the mechanical output of an internal combustion engine. Shaft 24 also typically supports a flywheel 190. The illustrated shaft 24 is supported for rotation by bearings 192 and the clutch drum is journalled on shaft 24 and is supported thereon by bearings 194, 196. The clutch drum is held against translation in the direction of the shaft rotating axis by bearings 198. The clutch drum can be connected at end 200 to a rotatable member such as a friction drive wheel for powering a bicycle.

Although the representation of FIG. 12 is highly schematic, the general configuration shown there is a typical application of the clutch of this invention. The speeds mentioned above and in FIG. 11 represent one typical example. They can be adjusted up or down by changing spring rates and/or clutch member weights in order to meet specific engine characteristics and drive ratios.

ADVANTAGES OF THE INVENTION AND UNOBVIOUSNESS

The centrifugal clutch according to the invention provides an apparatus adapted to today's high speed engines and traffic patterns. By carefully selecting the location of the spring connections to the clutch members, the limitations imposed by the earlier automatic clutches (and in particular that described in French Pat. No. 1,169,492) are avoided. The clutch, according to the invention, thus advantageously provides a unit having a clearly defined range of idle speeds. According to one embodiment of the invention, the range may advantageously be extended, if desirable, by use of a second pair of springs as described in connection with FIGS. 7-9.

The invention further provides significantly greater immunity to the effects of variations in component parts by using spring configurations which require a relatively long spring extension. Thus, a small change in component dimensions does not significantly degrade operational performance.

Thus, the advantages realized by the structure of the present invention are unavailable and undisclosed in prior art devices such as the clutch described in French Pat. No. 1,169,492.

Other embodiments of the invention, including additions, subtractions, deletions, and other modifications of the disclosed preferred embodiment of the invention, will be obvious to those skilled in the art and are within the scope of the following claims.

What is claimed is:

1. An automatically acting centrifugal clutch comprising
   a rotating support member having a first rotation axis,
   first and second single element integral clutch members, each said clutch member being supported by said support bars, each said clutch member being supported by said support member along a respective pivot axis for pivotal rotation movement about said pivot axis in a plane normal to said rotation axis, and each pivot axis being parallel to, separated from, and symmetrically placed with respect to said rotation axis,
   a rotatable clutch drum having
   an axis of rotation concentric with said first rotation axis, and
   a circular, inwardly facing, frictional drive surface radially spaced from and parallel to said rotation axis,
   said clutch members each further having a center of gravity
      a driving surface and a driven surface, said surfaces having a radius of curvature substantially equal to the radius of curvature of said frictional drive surface, and
      said clutch members being pivotably supported so that said driven surfaces each engage said friction drive surface in a first pivotal position of each clutch member, and said driving clutch surfaces each engage said frictional drive surface in a second pivotal position of said clutch members,
   first and second spring members, each connected in a fixed positional relationship relative to said driven and driving surfaces, and of the respective clutch members said spring members connected between the first and second clutch members,
      each of said springs being under tension and each spring, at each connection point of a first spring end with a clutch member, exerting substantially no rotational force for urging a said driving surface against said frictional drive surface, each spring, at a respective second end, being connected to a respective clutch member for urging said corresponding driving surface against said frictional drive surface in a start-up state and connected at a position spaced further from said clutch pivot point than the center of gravity of said respective clutch member and
   said single element clutch members each having a fixed mass distribution and said springs having a spring constant whereby
      below a first rotational speed of said support member, said driven clutch surface is in driven contact and engagement with said frictional drive surface,
      upon rotation of said support member beyond said first rotational speed and less than a second rotational speed greater than said first rotational speed, said driven clutch surface pivots out of engagement with the frictional drive surface, and
      upon rotation of said support member beyond said second rotation speed, said driving clutch surface is urged against and engages said friction drive surface with a force which is a monotonically increasing function of the rotation speed, and
      whereby, when said clutch members pivot from said first position wherein said driven clutch surfaces engage said frictional drive surface to said second position wherein said driving clutch surfaces engage said frictional drive surface, said spring members extend at a rate greater than the radial rate of travel of each clutch member center of gravity thereby defining a range of rotational speed in which the clutch surfaces do not engage the frictional drive surface.

2. The centrifugal clutch of claim 1 wherein one end of each spring member is connected to a respective clutch member substantially at said clutch member pivot axis.

3. The centrifugal clutch of claim 1 wherein said spring members are leaf springs.

4. The centrifugal clutch of claim 1 wherein the difference between said first and second rotational speeds is at least 100 rpm.

5. An automatically acting centrifugal clutch comprising
   a rotating support member having a first rotation axis,
   first and second single element clutch members, each said clutch member being supported by said support member along a respective pivot axis for pivotal rotation movement about said pivot axis in a plane normal to said rotation axis, and each pivot axis being parallel to, separated from, and symmetrically placed with respect to said rotation axis,
   a rotatable clutch drum having
      an axis of rotation concentric with said first rotation axis, and
      a circular, inwardly facing, frictional drive surface radially spaced from and parallel to said rotation axis,
   said clutch members each further having a center of gravity
      a driving surface and a driven surface, said surfaces having a radius of curvature substantially equal to the radius of curvature of said frictional drive surface, and
      said clutch members being pivotably supported so that said driven surfaces each engage said friction drive surface in a first pivotal position of each clutch member, and said driving clutch surfaces each engage said frictional drive surface in a second pivotal position of said clutch members, first and second spring members, each connected in a fixed positional relationship relative to said driven and driving surfaces, and between the first and second clutch members, said first and second springs each having a first end connected to the first and second clutch members respectively substantially at the respective pivot axis of the clutch member whereby said first ends maintain a substantially fixed position as the respective clutch member pivots about the respective pivot axis, each of said springs being under tension, and each spring, at a respective second end, being connected to a respective clutch member for urging said corresponding driving surface against said frictional drive surface in a start-up state, and connected at a position spaced further from said clutch pivot point than the center of gravity of said respective clutch member and said single element clutch members each having a fixed mass distribution and said springs having a spring constant whereby whenever the rate of rotation of said support member is below a first rotational speed, said driven surface engages and is in contact with said frictional drive surface, upon rotation of said support member beyond said first rotation speed and less than a second rotation speed greater than the first rotation speed, said driven clutch surface pivots out of engagement with the frictional drive surface, and upon rotation of said support member beyond said second rotation speed, said driving clutch surface is urged against and engages said friction drive surface with a force which is a monotonically increasing function of the rotation speed, and whereby, when said clutch members pivot from said first position wherein said driven clutch surfaces engage said frictional drive surface to said second position wherein said driving clutch surfaces engage said frictional drive surface, said spring members extend at a rate greater than the radial rate of travel of each clutch member center of gravity thereby defining a range of rotational speed in which the clutch surfaces do not engage the frictional drive surface.

6. The centrifugal clutch of claim 1 or 5 further comprising third and fourth spring members connected between said first and second clutch members, said third and fourth spring members being in a relaxed condition when said clutch members are in said first position, and in a tensioned condition when said clutch members are in said second position, whereby the extent of said range of rotational speed in which said clutch surfaces do not engage said frictional drive surface is extended.

* * * * *